Patented Oct. 8, 1940

2,217,322

UNITED STATES PATENT OFFICE 2,217,322

COATED EDIBLE PRODUCT

Robert P. Russell, Short Hills, N. J., assignor to Standard Oil Development Company, a corporation of Delaware No Drawing. Application March 26, 1938, Serial No. 198,251

3 Claims. (Cl. 99—168)

The present invention relates to improvements in coated edible products and methods of preparing same, and it relates more particularly to the use of certain types of polymers for the production of protective films upon edible products such as fruits, vegetables, nuts, eggs, etc.

This application is a continuation-in-part of application serial No. 681,667, filed July 21, 1933.

The chief object of this invention is to provide edible products with a protective coating to prevent or reduce dehydration (drying), shrinking, becoming rancid, and various other types of deterioration by decay, dampness, mold, or insects. An important advantage of this invention is that it provides such a protective coating in the form of a substantially colorless, yet flexible and tenaciously adhering film which is unexpectedly superior in closing the pores on the surface of the edible products treated, and is surprisingly efficient in moistureproofing these products both as to preventing the giving off of moisture or absorption of moisture.

Broadly the invention comprises providing on the surface of the edible products, a film comprising a viscous to solid, plastic and/or elastic, substantially saturated aliphatic hydrocarbon having a molecular weight above about 1,000 (as determined by the viscosity method described in Staudinger's Book, "Die Hochmolekularen Organischen Verbindungen," H. Staudinger Berlin 1932 Verlag Von Julius Stringer, page 56). The protective film may consist of this high molecular weight hydrocarbon alone, or in conjunction with a relatively non-volatile mineral white oil.

The preferred type of high molecular weight hydrocarbon is an iso-olefin polymer which may be made by polymerizing isobutylene, 2-methyl butene-1, and the like at temperatures below about −10° C. with a halide catalyst such as boron fluoride, aluminum chloride, titanium tetrachloride, etc. The polymer may have an average molecular weight ranging from about 1,000 up to 250,000 or more; various intermediate molecular weights may be prepared such as 3,000, 10,000, 15,000, 30,000, 50,000, 80,000, 100,000, 150,000 etc. The molecular weight of the polymer is generally controlled by the purity of the olefin and the temperature of the polymerization. The higher molecular weight polymers are obtained at very low temperatures with very pure olefins. The polymerization is preferably carried out in the presence of a suitable hydrocarbon solvent or diluent such as naphtha or a liquid or gaseous hydrocarbon such as propane or ethylene, which is adapted to serve both as solvent and refrigerant. After the polymerization has been completed, the product is freed from residual catalyst by any suitable means such as hydrolyzing with water or aqueous caustic soda solution. If desired, before or after removal of the catalyst, the polymer may be separated into fractions having certain desired molecular weight ranges as by dissolving the polymer in a suitable hydrocarbon solvent such as naphtha and precipitating out the higher molecular weight fractions by adding a suitable precipitant or non-solvent such as acetone, alcohol, etc.

Generally, the resulting colorless plastic or elastic polymer produced in the above-described process has, when properly washed, an iodine number below 10 and preferably below 5, for instance, 1 or 2. This indicates that the product is substantially saturated in respect to hydrogen.

Although the above-described polymers are preferred on account of their superior characteristics, it is possible to obtain results which are, in some respects, similar, but not quite as good, by using hydrogenated natural or synthetic rubber. It is difficult to prepare this hydro-rubber with as low an iodine number as the high molecular weight polymers referred to above, but for some purposes they are satisfactory.

In carrying out the invention, the above-described high molecular weight saturated hydrocarbon material is preferably dissolved in a relatively non-volatile refined mineral white oil such as one having a Saybolt viscosity between the approximate limits of about 60 and 500 seconds at 100° F. Such white oils are generally obtained by treating petroleum distillates of the lubricating boiling range with strong acids such as concentrated sulfuric acid. Such refined white oils of various grades of viscosity are obtainable on the market under different trade names, such as Marcol, which has a viscosity of about 80 to 90 seconds Saybolt at 100° F.; this product is very satisfactory for the purpose of the present invention. Other more viscous grades of white oils such as "Nujol" may be used under certain circumstances such as at more elevated temperatures or when it is desirable to have a fairly viscous coating with a much smaller amount of polymer than would have to be used with a more fluid white oil to obtain a solution having the same viscosity. The solution of the polymer in the white oil may be accelerated by agitation or kneading and also by the application of heat.

It is understood, of course, that the protective coating may be rubbed off with a cloth or washed off with soapy water and rinsed thoroughly, or in the case of certain edible products having thick skins or rinds or which have shells which must be removed before eating the edible portion, the protective film may be left on the outer surface, as the edible portion can be separated without coming in contact with the coating. However, it should be understood that one advantage of this invention is that the protective film, provided by this invention, is physiologically non-toxic both as to the high molecular weight polymer as well as the mineral white oil used as solvent and no harmful effect need be expected if either accidentally or on purpose some of the edible product having the protective film still on it is taken internally. It is well known that refined mineral white oils are practically inert or, in other words, are not at all digested when taken internally but merely have a laxative action.

If desired, suitable dyes, pigments, insect repellents and mold preventatives may be dissolved or suspended in the protective coating material with or without the addition of other materials such as pigments, waxes, resins, etc.

For the sake of illustration and without intending that the invention be limited thereby, the following specific examples are given:

Example 1

5% by weight of polyisobutylene having an average molecular weight of about 3,000 is dissolved in 95 parts by weight of a refined mineral oil of about 80 to 90 seconds Saybolt viscosity at 100° F. and the solution is applied as a coating on various fruits such as applies, oranges, plums, etc., and vegetables such as potatoes, carrots, beets, eggplant, etc.

The protective coating reduced the drying out of the fruits and vegetables during storage over a long period of time, and also greatly reduced the shrinkage. The thin, oily film was readily removed by preliminary wiping with a dry absorbent cloth and residual traces of the oil were then easily removed by washing with soapy water and rinsing in fresh water.

Example 2

A polyisobutylene having an average molecular weight of about 10,000 was dissolved in some of the same mineral white oil used in Example 1, but in this case the concentration of the polymer was 10%. The solution was brushed onto a number of different types of nuts, e. g. English walnuts, Brazil nuts, Chinese (lichee) nuts, pecans, almonds, and filberts. These were stored with like nuts, untreated. After storage for a number of months, it was found that the treated nuts were all fresh and edible long after the untreated ones had become rancid or dry, or both.

If the above-described high molcecular weight saturated hydrocarbon material is to be used as the sole or chief constituent of the protective film on the edible product, it may be satisfactorily applied by dissolving it in a suitable volatile solvent, preferably a hydrocarbon solvent such as a varnolene having a boiling range of about 300–400° F., or a naphtha having a boiling range of about 100–250° F., or a mixed solvent such as gasoline boiling from about 100–410° F.; even slightly lower boiling solvents such as petroleum ether, liquefied pentane or butane, etc., may be used. A volatile halogenated solvent such as carbon tetrachloride may be used in addition to or instead of the hydrocarbon solvent. If desired, the solvent may be heated somewhat in order to accelerate solution of the polymer in the solvent. If a low-boiling solvent is used, the heating may be carried out under sufficient pressure to prevent undue evaporation of the solvent. Agitation, especially a kneading action, will facilitate solution of the polymer.

The amount of the solvent to be used will depend upon several factors, cheif of which is the molecular weight of the polymer, which has a substantial thickening effect, the increase in viscosity being directly proportional to the molecular weight of the polymer. For instance, in preparing a solution have a certain desired viscosity, approximately 10 times as much of a 10,000 molecular weight polymer can be used as of a 100,000 molecular weight polymer.

The viscosity of the final solution should be relatively thin if the solution is to be applied to the surface of the edible products by spraying or dipping, or it may be either thin or viscous if it is to be applied by brushing or rubbing on by hand. Also, the solution should be relatively viscous if the edible products to be coated have a very smooth and perhaps even polished surface such as certain types of apples, pears, etc., or if they have a natural waxy coating on the surface which is not readily wetted by thin solutions.

After the solution of the polymer has been applied to the surface of the fruit or other edible product, the solvent is allowed to evaporate or is forcefully evaporated by the use of heat, vacuum, or air blowing, or any combination of these, and after evaporation, a thin, tenaciously adhering film of the polymer remains on the surface of the edible product. The thickness of the polymer film will depend upon the conditions such as temperature and time during which the products are to be protected such as during storage, shipment, or standing on the shelves or counters in stores, etc., waiting to be sold, but generally the thickness of the polymer film should be between the approximate limits of 0.001 and 0.02 of an inch.

The foregoing description is merely illustrative and various modifications may be made within the scope of the appended claims, in which it is intended to claim all novelty inherent in the invention, as broadly as the prior art permits.

I claim:

1. An edible product selected from the group consisting of fruits, vegetables, nuts, eggs, and the like, normally subject to dehydration and deterioration during storage, coated with a thin, adherent, non-oxidizing and non-hardening, waterproof and moistureproof, film consisting essentially of a major proportion of a relatively non-volatile mineral white oil having a Saybolt viscosity of about 60–500 seconds at 100° F. and a minor proportion of an isobutylene polymer having an average molecular weight above about 1,000, said coated product being stabilized by said protective film, against dehydration and deterioration during storage.

2. The method of protecting edible products from dehydration and deterioration during storage and shipment which comprises applying to the surface of said edible products, a thin, flexible, non-oxidizing and non-hardening film comprising a colorless, viscous to solid, flexible, substantially saturated aliphatic hydrocarbon material having a molecular weight above about 1,000.

3. The method of protecting edible products selected from the group consisting of fruits, vegetables, nuts, eggs, and the like, against dehydration and deterioration during storage and shipment, which comprises applying to the surface thereof a thin, substantially colorless, tasteless-odorless, non-toxic, non-oxidizing and non-hardening film comprising a solution comprising a major proportion of a relatively non-volatile mineral white oil, and a minor proportion of a polyisobutylene having an average molecular weight above about 1,000.

ROBERT P. RUSSELL.